United States Patent

Haacke et al.

[11] 3,888,565
[45] June 10, 1975

[54] ELECTROCHROMIC VOLTAGE INDICATOR

[75] Inventors: Gottfried Christian Haacke, Stamford; Donald John Tracey, Jr., Weston, both of Conn.

[73] Assignee: American Cyanamid Company, Stamford, Conn.

[22] Filed: Jan. 2, 1973

[21] Appl. No.: 320,413

[52] U.S. Cl. .................................. 350/160; 324/71
[51] Int. Cl. ................................................ G02f 1/36
[58] Field of Search .... 350/160; 324/71 NE, 71 SN, 324/158 D, 158 T

[56] References Cited
UNITED STATES PATENTS
3,704,057  11/1972  Beegle ........................ 350/160
3,708,220  1/1973  Meyers et al. ................ 350/160

Primary Examiner—William L. Sikes
Attorney, Agent, or Firm—Charles J. Fickey

[57] ABSTRACT

An electrochromic BITE indicator for fault detection in integrated circuitry. The electrochromic structure utilizes an electrochromic paste cell concept and fits into a commercial TO—5 can/header assembly. The indicators operate between −41°C. and +50°C.

4 Claims, 3 Drawing Figures

ELECTROCHROMIC VOLTAGE INDICATOR

This invention relates to built in test equipment for electronic circuitry. It more particularly relates to an electrochromic indicator for defects in electronic circuitry, particularly solid state circuitry and modules.

Modern electronic equipment for data collection, data processing, and data transmission consists of numerous active (transistors, diodes) and passive (resistors, capacitors) components. Maintenance and testing economics have stimulated the adoption of a modular design concept for the complex electronic circuitry of this equipment. Groups of components are either fully integrated in single chip modules or partially integrated in hybrid modules. Each module is readily accessible so that in case of failure of one component the whole module can easily be replaced.

The large number of modules, which usually go into a unit, make failure detection by conventional methods time consuming. Conventional methods require the connection of each module to a test instrument and a subsequent meter reading. It is more economical to build into each module inexpensive test equipment which indicates module failure by optical means. Such Built-In Test Equipment (BITE) is activated by a voltage or current pulse and permanently signals a module failure, either permanent or transient.

Commercially available BITE indicators supplied, for example, by General Time Corp., A. W. Haydon Co. and others, operate on a mechanical principle. A colored flag, activated by a solenoid, is caused to appear behind a small window. Although these mechanical devices are of rugged construction and operate over a wide temperature range ($-54°C$. to $+105°C$.), they are quite expensive. The high price has restricted the use of these indicators mainly to military applications.

Utilization of the electrochromic effect as in the present invention for BITE indicators not only eliminates mechanical moving parts but also results in lower cost devices. The associated circuitry is arranged so that the EC display is only activated when a circuit variable, e.g., voltage, goes outside a pre-selected range. BITE devices as presently known are electromechanical in nature and require considerably larger switching voltages and currents than the equivalent EC device.

The electrochromic BITE indicator of the present invention is based on the electric field enhanced diffusion of electrons from an inert electrode and protons from an electrolyte into a transparent film of a persistent electrochromic material, e.g., a $WO_3$ film, to form a blue color in the film. Field reversal bleaches the film to its initial state. A detailed description and interpretation of the electrochromic effect can be found in U.S. Pat. No. 3,521,941, and copending, commonly assigned applications Ser. Nos. 41,154, now abandoned and 41,155, both filed May 25, 1970.

The electrochromic (EC) device described here is a modification of an earlier EC cell in which protons migrated between two $WO_3$ films separated by an opaque white electrolyte paste as described in copending commonly assigned application Ser. No. 41,153, filed May 25, 1970, and now abandoned. It has been found that in the BITE indicator a counter-electrode of $WO_3$ is not needed for the BITE configuration. Proton generation in the electrolyte occurs using a simple metal disc counter-electrode.

DETAILED DESCRIPTION OF THE INVENTION

Figure 1:
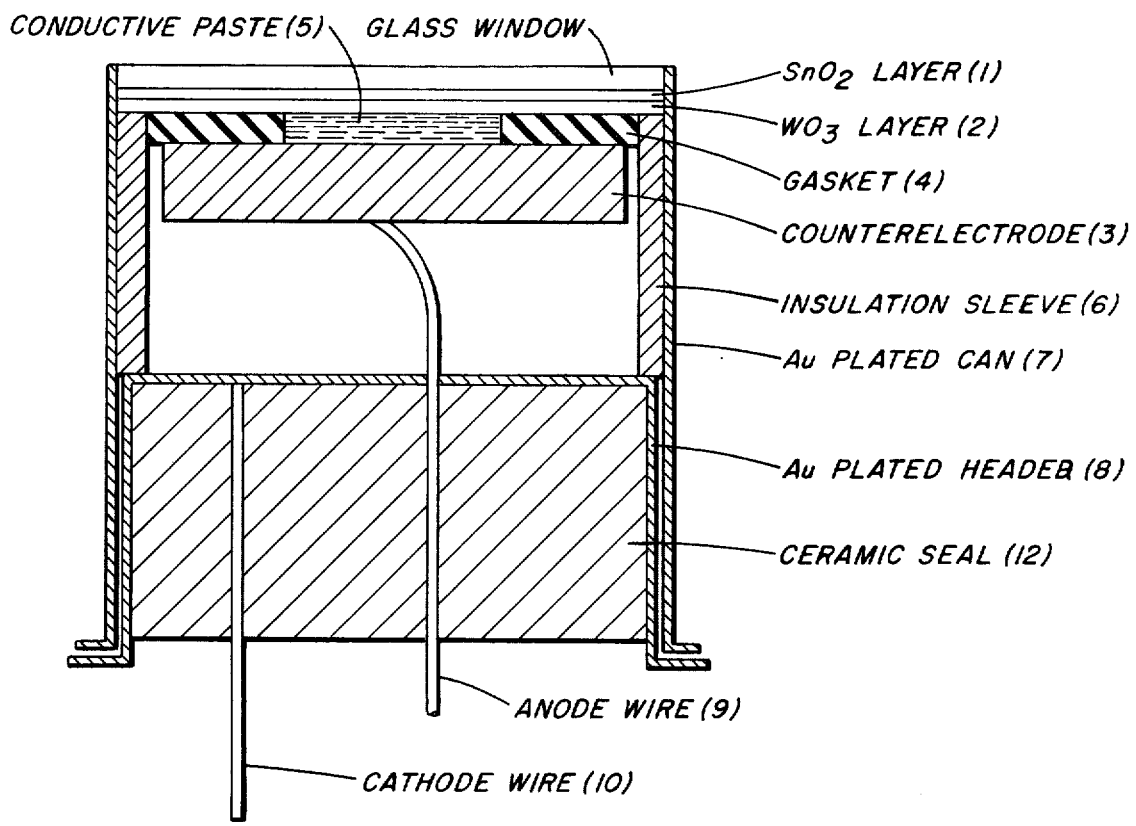

As used herein, a "persistent electrochromic material" is defined as a material responsive to the application of an electric field of a given polarity to change from a first persistent state in which it is essentially non-absorptive of electromagnetic radiation in a given wave length region, to a second persistent state in which it is absorptive of electromagnetic radiation in the given wave length region, and once in said second state, is responsive to the application of an electric field of the opposite polarity to return to its first state. Certain of such materials can also be responsive to a short circuiting condition, in the absence of an electric field, so as to return to the initial state.

By "persistent" is meant the ability of the material to remain in the absorptive state to which it is changed, after removal of the electric field, as distinguished from a substantially instantaneous reversion to the initial state, as in the case of the Franz-Keldysh effect.

Electrochromic Materials

The materials which form the electrochromic materials of the device in general are electrical insulators or semiconductors. Thus are excluded those metals, metal alloys, and other metal-containing compounds which are relatively good electrical conductors.

The persistent electrochromic materials are further characterized as inorganic substances which are solid under the conditions of use, whether as pure elements, alloys, or chemical compounds, containing at least one element of variable oxidation state, that is, at least one element of the Periodic System which can exist in more than one oxidation state in addition to zero. The term "oxidation state" as employed herein is defined in "Inorganic Chemistry", T. Moeller, John Wiley & Sons, Inc., New York, 1952.

These include materials containing a transition metal element (including Lanthanide and Actinide series elements), and materials containing non-alkali metal elements such as copper. Preferred materials of this class are films of transition metal compounds in which the transition metal may exist in any oxidation state from +2 to +8. Examples of these are: transition metal oxides, transition metal oxysulfides, transition metal halides, selenides, tellurides, chromates, molybdates, tungstates, vanadates, niobates, tentalates, titanates, stannates, and the like. Particularly preferred are films of metal stannates, oxides and sulfides of the metals of Groups (IV)B, (V)B and (VI)B of the Periodic System, and Lanthanide series metal oxides and sulfides. Examples of such are copper stannate, tungsten oxide, cerium oxide, cobalt tungstate, metal molybdates, metal titanates, metal niobates, and the like.

Additional examples of such compounds are the following oxides: MO oxides, e.g., MnO, NiO, CoO, etc.; $M_2O_3$ oxides, e.g., $Cr_2O_3$, $Fe_2O_3$, $Y_2O_3$, $Yb_2O_3$, $V_2O_3$, $Ti_2O_3$, $Mn_2O_3$, etc.; $MO_2$ oxides, e.g., $TiO_2$, $MnO_2$, $ThO_2$, etc.; $M_3O_4$ oxides, e.g., $Co_3O_4$, $Mn_3O_4$, $Fe_3O_4$, etc.; $MO_3$ oxides, e.g., $CrO_3$, $UO_3$, etc.; $M_2O_5$ oxides, e.g., $V_2O_5$, $Nb_2O_5$, $Ta_2O_5$ etc.; $M_4O_6$ oxides; $M_2O_7$ oxides, e.g., $V_2O_5$, $Nb_2O_5$, $Ta_2O_5$, etc.; $M_4O_6$ oxides, $M_2O_7$ oxides, such as $M_2O_7$; complex oxides such as those of the formula $XYO_2$ (X and Y being different metals), e.g., $LiNiO_2$, etc.; $XYO_3$ oxides, e.g., $LiMnO_3$, $FeTiO_3$, $MnTiO_3$, $CoTiO_3$, $NiTiO_3$, $LiNbO_3$, $LiTaO_3$, $NaWO_3$, etc.; $XYO_4$ oxides, e.g., $MgWO_4$, $CdWO_4$, $NiWO_4$, etc.;

$XY_2O_6$, e.g., $CaNb_2O_6$ ("Niobite" oxides); $X_2Y_2O_6$, e.g., $Na_2Nb_2O_6$; Spinel structure oxides, i.e., of the formula $X_2YO_4$, e.g., $Na_2MoO_4$, $NaWO_4$, $Ag_2MoO_4$, $Cu_2MoO_4$, $Li_2MoO_4$, $Li_2WO_4$, $Sr_2TiO_4$, $Ca_2MnO_4$, etc.; $XY_2O_4$, e.g., $FeCr_2O_4$, $TiZn_2O_4$, etc.; $X_2YO_5$ oxides, e.g., $Fe_2TiO_5$, $Al_2TiO_5$, etc.; and $X_3Y_3O$ (ternary) oxides, e.g., $Mo_3Fe_3O$, $W_3Fe_3O$, $X_3Ti_3O$ (where X is Mn, Fe, Co, etc.). For a discussion of some complex oxides, see Advanced Inorganic Chemistry, Cotton & Wilkinson, p. 51, (1966), Interscience Publishers, Inc., New York and Progress in Inorganic Chem., Vol. 1, 465 (1959) Interscience Publishers, Inc., New York. Also included are nitrides, and the sulfides corresponding to the above oxides. Hydrates of certain metal oxides may also be used, e.g., $WO_3·H_2O$, $WO_3·2H_2O$, $MoO_3·H_2O$ and $MoO_3·2H_2O$.

While the general mechanism of persistent electrochromism is unknown, the coloration is observed to occur at the negatively charged electrochromic layer. Generally, the phenomenon of persistent electrochromism is believed to involve cation transport such as hydrogen or lithium ions to the negative electrode where color centers form in the electrochromic image layer as a result of charge compensating electron flow.

When the persistent electrochromic materials are employed as films, thickness desirably will be in the range of from about 0.1–100 microns. However, since a small potential will provide an enormous field strength across very thin films, the latter, i.e., 0.1–10 microns, are preferred over thicker ones. Optimum thickness will also be determined by the nature of the particular compound being laid down as a film and by the film-forming method since the particular compound and film-forming method may place physical (e.g., non-uniform film surface) and economic limitations on manufacture of the devices.

When tungsten oxide is employed as the electrochromic imaging material and an electric field is applied between the electrodes, a blue coloration of the previously transparent electrochromic layer occurs, i.e., the persistent electrochromic layer becomes absorptive of electromagnetic radiation over a band initially encompassing the red end of the visible spectrum, thereby rendering the imaging layer blue in appearance. Prior to the application of the electric field, the electrochromic imaging layer was essentially non-absorbent and thus transparent.

Electrolyte Layer

A semi-solid ion conductive gel may be employed. One embodiment comprises in combination sulfuric acid and a gelling material for the acid. Any gelling agent which is compatible with the other components is suitable. Particularly advantageous gelling agents are polyvinyl alcohol, polyacrylamide, sodium silicate, cab-o-sil, and the like.

A preferred embodiment employs $H_2SO_4$ in combination with polyvinyl alcohol. The properties of this gel may be varied in advantageous manner by employing polyvinyl alcohol of various molecular weights, differing sulfuric acid concentration and different polyvinyl alcohol to acid ratios. Thereby, gels can be produced to give a specific conductivity in the range of from about 0.10 to 0.60 $ohm^{-1} cm^{-1}$.

A distinct advantage of the above mentioned gels is their high ionic conductivity and good chemical stability. We have found that both requirements are unexpectedly met by gels in the preferred conductivity range of 0.20–0.40 $ohm^{-1} cm^{-1}$.

Other materials may be incorporated into the gel to vary the physical properties of the gel such as viscosity and vapor pressure. Thus, the composition may optionally include organic solvents such as dimethyl formamide, acetonitrile, propionitrile, butyrolactone and glycerin.

Further, the gels used in the instant invention may be made opaque with, for example, stable, white or colored pigments such as $TiO_2$ or $TiO_2$ doped with Ni, Sb for use in certain electrochromic display device applications. A fluid layer containing an acid may also be used in place of the gel, as disclosed in copending, commonly assigned application Ser. No. 41,154, filed May 25, 1970.

The electrolyte layer may also be made ionically conductive by a semi-solid material such as a paste, grease or gel containing some ionically conducting materials. The dispersing medium may be one selected from a group consisting of an ionically conductive paste, grease or gel. A preferred embodiment in the present invention comprises the use of a conductive lithium stearate grease containing dispersed therein propylene carbonate and p-toluene sulfonic acid. The semi-solid medium can contain one or more salts selected from Group IA and IIA alkali or alkaline earth materials. Smaller ions such as lithium and sodium are preferred to larger ions as potassium and rubidium since ionic mobility in the electrochromic layer may be a limiting factor. The significant improvements in electrode reversibility and reproducibility and the important advantage of long term stability of operation by use of these gels were unexpected. This is a significant advantage in applications requiring long term service stability.

Figure 1A:
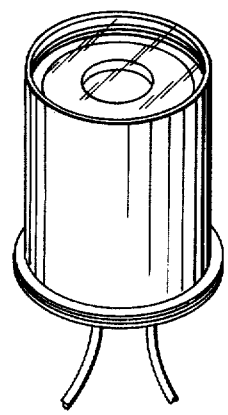
Figure 2:
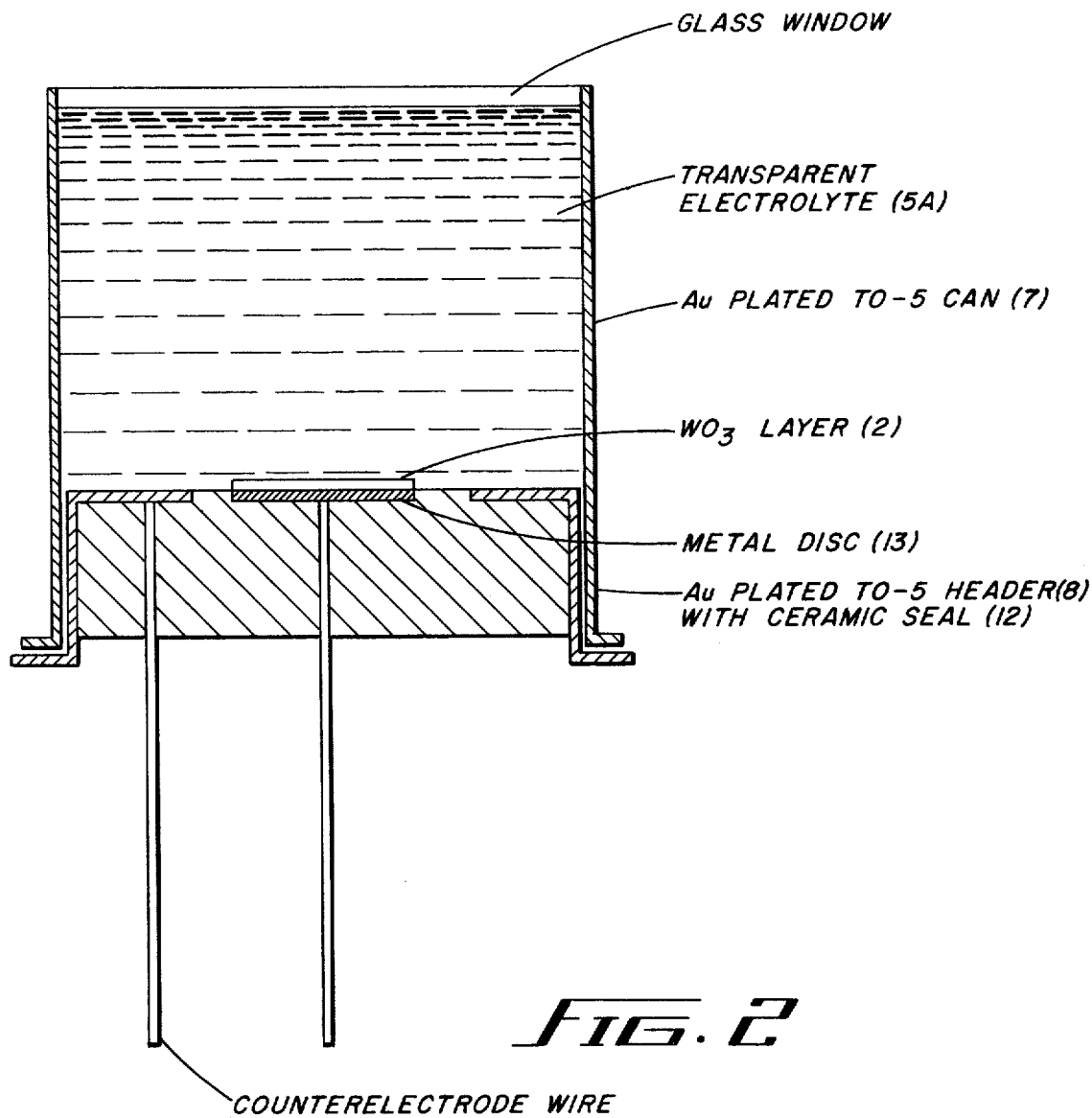

The invention may be better understood by reference to the drawings in which:

FIG. 1 is a cross-sectional view of an electrochromic BITE indicator utilizing spaced apart electrodes, FIG. 1A is a view of a typical electrochromic BITE indicator, and FIG. 2 is a cross-sectional view of an alternative construction of an electrochromic BITE indicator with both electrodes in the same plane.

Referring in greater detail to the figures, FIG. 1 shows one design of the EC BITE indicator.

The device consists of a photo-diode can. On the inside of the glass window a transparent 11, conductive $SnO_2$ layer 1 is deposited. On top of the $SnO_2$ layer a $WO_3$ film 2 of a thickness between 0.5–2 $\mu$ is evaporated. A counter-disc is placed opposite the $WO_3$ film. A silicon rubber gasket 4 keeps the counter-electrode in a fixed distance from the $WO_3$ film. The free space 5 between counter-electrode and $WO_3$ film is filled with a white, opaque electrolyte paste 5. A plastic sleeve 6 isolates the counter-electrode 3 electrically from the can wall 7 which is used as an electrical connection to the $WO_3$ film 2. The device is sealed off by a header 8. The header 8 contains two electrical leads 9, 10. Lead 9 makes electrical contact to the counter-electrode 3 while lead 10 is electrically connected to the can wall 7.

A modification of the above structure, not shown, consists of replacing the photo-diode can by a glass envelope. In this case the whole inside of the glass envelope is covered by a $SnO_2$ layer with the $WO_3$ film on top of it. The counter-electrode should have the shape of the glass envelope in order to achieve a fast and uniform coloring and bleaching.

This EC structure fits into standard TO—5 cans 7 (GTI Corporation, Providence, R.I.). These cans consist of a 0.307 in. diameter glass viewing window, hermetically sealed to one end of a gold plated Kovar tube (0.238 in. height). The open end of TO—5 cans 7 can be closed with a TO—5 header 8. The header 8 is also made of gold plated Kovar and contains a vacuum tight ceramic seal 12 for the lead-through wire.

The electrochromic $WO_3$ layer 2 is vacuum deposited on the inside of the glass window on top of transparent $SnO_2$ layer 1. The $SnO_2$ layer 1 provides electrical contact to the TO—5 can wall. A spray-on insulation 6 on part of the inner can wall and the outer rim of the window insulates the counter-electrode from direct electrical contact with the can wall. Electrical contact from the counter-electrode 3 to the $WO_3$ film 2 is only made through the conductive paste 5 which also provides the protons for injection into the $WO_3$ film.

The electrolyte paste consists of 25 weight percent concentrated sulfuric acid, 25 weight percent pigment grade titanium dioxide, 25 weight percent glycerin, and 25 weight percent lithium stearate (No. 306 Witco Chemical). Careful mixing of all components is important since compositional inhomogeneities of the paste lead to spotty coloration of the $WO_3$ film. An initial hand mixing is followed by thorough muller mixing. The finished paste has to be stored in a tightly capped glass bottle to prevent drying out.

Preparation of TO—5 can

1. Deposition of $SnO_2$ layer

Required properties of the $SnO_2$ layer are transparency and low electrical resistance (less than 1000 Ω between window center and can wall). Reagent grade stannous chloride ($SnCl_2 \cdot 2H_2O$) is melted in a glass flask under a stream of oxygen (3 liters/min) and slowly heated to 180°C. During the initial heating the hydration water is vented. Dehydration occurs at approximately 130°C. which causes a temporary temperature plateau. After completion of the dehydration, the temperature rises again. During dehydration and heating, nitrogen streams through the system in order to flush out any residual moisture.

Deposition of the $SnO_2$ is carried out after the stannous chloride melt reaches 180°C. Nitrogen flow is stopped, and an oxygen stream admitted to carry the $SnCl_2/SnO_2$ vapors to the TO—5 windows. The cans are kept between 400°–425°C. during deposition. Deposition time is three minutes.

2. Deposition of $WO_3$ film

A 1 μ thick amorphous $WO_3$ film is evaporated on top of the $SnO_2$ layer by standard vacuum evaporation. The evaporation is carried out in a $5.5-10^{-5}$ Torr vacuum with the cans kept at 100°C. Purified Tungstic Anhydride (Fisher Scientific Co.) is used as source material.

3. Spray-on insulation

Reliable operation of BITE indicators is best assured if the internal electrical connection between EC film and counter-electrode is made exclusively through the electrolyte paste. In order to prevent direct electrical contact between counter-electrode and can wall an insulating layer consisting of a Krylon base (Krylon, Inc., Norristown, PA.) and an Emralon 323 (Acheson Colloids Co., Port Huron, Mich.) top coat is sprayed into portions of the can (see FIG. 1: Spray on insulation).

For masking off the center portion of the window during spraying a 2 mm thick, 5 mm diameter RTV-Rubber disc is placed on the window. A Krylon coat is then sprayed on and after drying the Emralon 323 layer is sprayed on top of the Krylon. The rubber mask is removed as soon as the Emralon starts setting.

Preparation of TO—5 header

The counter-electrode, as part of the header configuration, consists of a 6 mm diameter gold disc (0.25 mm thick). Gold sheet was used for convenience. However, a gold plated metal disc could be used as well. Space limitations within the can allow only about 1 mm free space between header top and counter-electrode so that soldering becomes unfeasible. As an alternative therefor the counter-electrode wire is bent and electrical contact to the counter-electrode is made with a drop of silver epoxy during assemblage.

BITE assemblage

A small amount (approximately 0.04 c.c.) of electrolyte paste is placed in the center of the can glass window and the counter-electrode pushed carefully into the can until it touches the spray-on insulation on the window. A drop of conductive silver epoxy (E-Solder Epoxy No. 3021, Epoxy Products Co., New Haven, Conn.) is then deposited on the counter-electrode in order to assure good electrical contact to the feed-thru wires.

Before the final assemblage the top rim of the TO—5 can is carefully scraped for a final removal of any insulating deposits ($WO_3$, spray-on insulation etc.). Thereafter, the rim is coated with silver epoxy No. 3021 which not only seals header and can to each other but also provides a reliable electrical connection. The header is now slowly pushed into the can and clamped with two clips to the can until the silver epoxy is cured for 12 hours at room temperature.

On application of a negative dc voltage to the EC electrode wire protons migrate into the EC film and color it blue. Voltage reversal bleaches the film. Color and bleach speeds increase with increasing voltage.

Typical data of BITE's for room temperature operation are shown in Table 1. Values for color/bleach times contain a certain degree of subjectivity due to the individual's judgement of what is "dark blue". The determination of cycle life also involves a certain degree of arbitrariness since the devices do not break down instantly but deteriorate gradually.

Low temperature tests were performed in a slush bath by mixing liquid nitrogen with acetonitrile in a glass beaker. The temperature of this bath is −41°C. Two test BITE's were fully immersed in the bath, and after five minutes their color/bleach properties observed through the glass beaker walls. In general, color/bleach speeds slow down with decreasing temperature. However, even at −41°C. ten seconds at 2.5 volts are only needed to obtain a medium blue color. Bleaching times are equivalent.

TABLE I

Operating Characteristics of BITE Indicators at Room Temperature

| Applied Voltage [V] | Color/Bleach Time[1] [sec] | Max. Current [mA] | Cycle Life[2] [number of cycles] |
|---|---|---|---|
| 2 | 4 | 0.3 | 5000 |
| 3 | 3 | 0.5 | 3000 |
| 5 | 1 | 0.9 | 200 |

[1] Time required to color BITE to dark blue or bleach from dark blue to white. Data taken on 25 BITE's
[2] One cycle: 5 sec color – 25 sec rest – 5 sec bleach – 25 sec rest High temperature operation tests were run at +50°C. and +60°C. with the BITE's stored at these temperatures either bleached or colored and periodically tested at room temperature without adverse effect.

While metallic counter-electrodes have been described, we also may use carbon or graphite as a counter-electrode.

While certain specific embodiments of BITE construction have been described, it will be obvious that these are solely for illustration and that the invention is not limited thereto.

What is claimed is:

1. A device for fault detection in integrated circuitry comprising an electrochromic current flow indicator means, container means, and electrical circuit connector means, said container means comprising a metallic can sealed at one end with a glass window, and at the other end with a metallic cup, said indicator means being in said container means and comprising a layer of a persistent electrochromic material, a counterelectrode and an electrolyte therebetween, said electrical connector means being connected to said device so as to allow passage of an electrical current between said electrochromic layer and said counterelectrode.

2. The device of claim 1 wherein the persistent electrochromic material is tungsten oxide.

3. A device as in claim 1, which comprises a transparent electrically conductive layer on the inner surface of said glass window an electrochromic material on said transparent conductive layer, and a counter-electrode separated by an electrolyte layer, and electrical connections to said electrochromic material and counterelectrode.

4. The device of claim 3, wherein said counterelectrode is metallic.

* * * * *